(12) United States Patent
Ragan et al.

(10) Patent No.: US 6,214,262 B1
(45) Date of Patent: Apr. 10, 2001

(54) MOLDING OF MOLDING POLYMERS

(75) Inventors: Paula Ragan, Brookline; Alan Grodzinsky, Lexington, both of MA (US); Vicki Chin, Holmdel, NJ (US); Han Hwa Hung, Canton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/268,444

(22) Filed: Mar. 12, 1999

(51) Int. Cl.$^7$ .......................... B29B 39/02; B29B 39/42; B29B 67/24
(52) U.S. Cl. .......................... 264/39; 264/219; 264/240; 264/299; 264/337; 264/138; 264/233; 424/93.7; 435/178; 435/182
(58) Field of Search .......................... 264/138, 219, 264/240, 299, 337, 39, 233; 424/93.7; 435/174, 178, 182, 395, 396, 397

(56) References Cited

U.S. PATENT DOCUMENTS 4,172,128 * 10/1979 Thiele .................................... 424/95
5,334,640 * 8/1994 Desai et al. ............................. 524/56
5,709,854 * 1/1998 Griffith-Cima et al. ............ 424/93.7

OTHER PUBLICATIONS

Journal of Orthopaedic Research, vol. 10, No. 6, 1992 "Chondrocytes in Agarose Culture Synthesize a Mechanically Functional Extracellular Matrix".

* cited by examiner

Primary Examiner—Jan H. Silbaugh
Assistant Examiner—Kenneth M. Jones
(74) Attorney, Agent, or Firm—Samuels, Gauthier & Stevens

(57) ABSTRACT

A method of producing a three dimensional section of polymerized liquid. The method includes providing a molding apparatus which includes a mold having at least one side, at least one piece of porous material adjacent to the one side of the mold and at least one support layer adjacent to the piece of porous material. The molding apparatus is clamped together and a liquid is added between the frame and the porous material. The filled molding apparatus is placed in a bath of polymerizing agent until the liquid polymerizes to form a three dimensional section.

18 Claims, 1 Drawing Sheet

MOLDING OF MOLDING POLYMERS

This invention was made with government support under NIH-5R01-AR33236 awarded by the National Institute of Health. The government has certain rights in the invention.

BACKGROUND OF THE INVENTION

1. Field of the Invention

This invention relates generally to producing a three dimensional section of a polymerized liquid. The liquid may contain cells and the polymerization is reversible so that the cells may be re-isolated from the three dimensional section.

2. Description of the Prior Art

Previously liquid monomers have been polymerized into three dimensional slabs by casting agarose between slab gel electrophoresis plates separated by 1-mm thick Teflon spacers. After the gelling of the slab was complete, disks were cored from the slab. Cells such as chondrocytes could be added, for example, in DMEM (Dulbecco's Modified Eagles Medium) mixed with PBS (Dulbecco's phosphate buffered saline) containing low melting temperature agarose. This method is useful for testing the mechanical and electromechanical properties of the disks of chondrocyte/agarose disks and control disks with no cells. However, with the use of this method the polymerization of the slab is not reversible. Thus, the cells can not be re-isolated from the slab after the polymerization to conduct further research and testing on the individual cells, such as mRNA testing, etc.

Alginate, a seaweed derived polymer, allows cells to be maintained in a site that resembles native tissue, thus, it is a preferred media for growing and testing cells. Monomers such as alginate, which are viscous liquids polymerized by ion diffusion. Previously the only known method for polymerizing the alginate was to drop small drops of the alginate from the tip of a syringe into a polymerizing bath containing a polymerizing agent. The cell morphology may remain intact, however, the alginate beads are not suitable for mechanical compression studies.

The objective of the present invention is to provide a reversible diffusion controlled method of polymerizing liquid into solids of various shapes, sizes and thicknesses.

Another objective of the present invention is to maintain cells in culture for tissue engineering purposes.

SUMMARY OF THE INVENTION

In accordance with the present invention, there is provided a method of producing a three dimensional section of polymerized liquid, specifically of a monomer. The method includes the utilization of a molding apparatus. The molding apparatus includes a frame having filter paper on each side thereof and support layers on the outer surfaces of the filter paper. The molding apparatus is clamped together and a liquid monomer is added between the frame and one piece of the filter paper. The filled molding apparatus is placed in a bath of polymerizing agent until the liquid polymerizes to form a three dimensional section. The monomer may include cells.

BRIEF DESCRIPTION OF THE DRAWINGS

Other objects, features and advantages of the present invention will become apparent in light of the following detailed description in connection with the accompanying drawings, wherein.

DETAILED DESCRIPTION OF THE ILLUSTRATED EMBODIMENT

Some liquids polymerize by ion diffusion. Thus, the polymerization of the liquids must be controlled in order to properly polymerize the liquid and to obtain a final product which retains its desired shape and form. The present invention is specially adapted for use with monomers, specifically alginate, although not limited in application to the one liquid. Alginate is an important polymer because it allows cells to be maintained in a site that resembles native tissue, and thus can be used to culture cells for subsequent tests.

Figure 1:
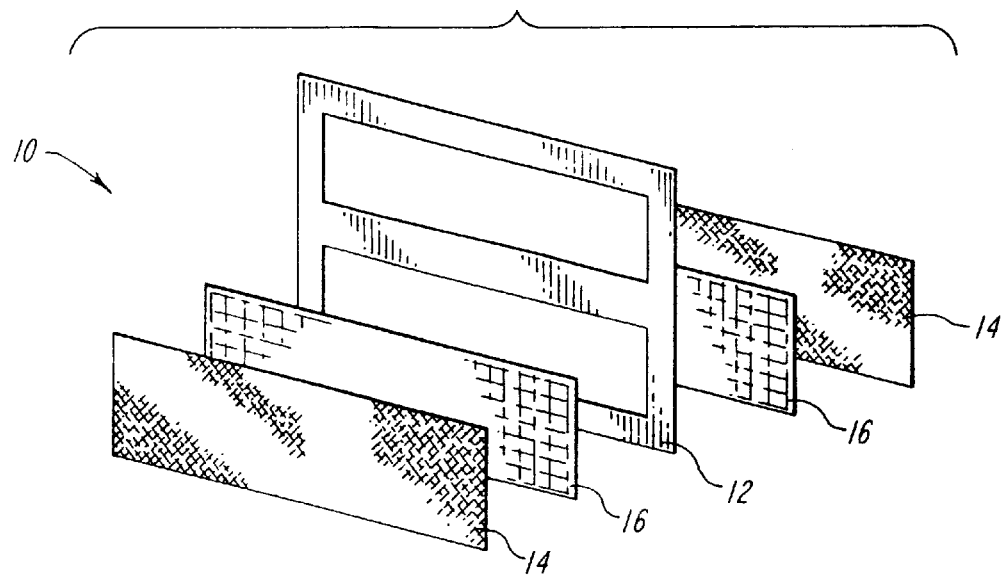
FIG. 1 is an exploded view of a molding apparatus in accordance with the present invention.
Figure 2:
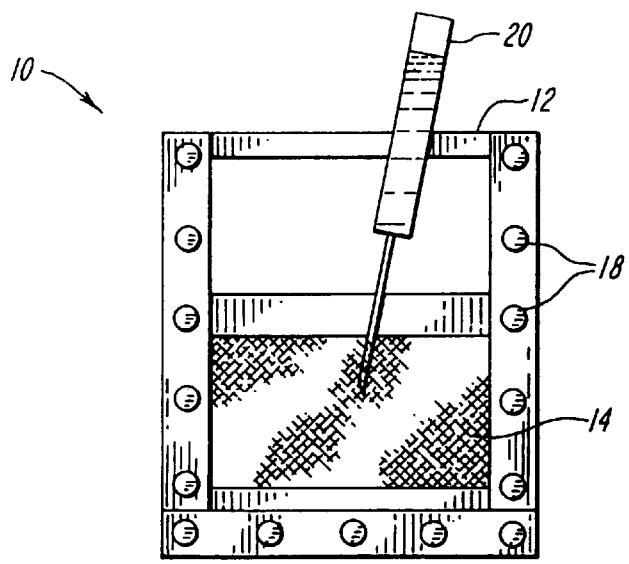
FIG. 2 is a view of the assembled apparatus shown in FIG. 1 having a syringe positioned therein to deposit a liquid within the apparatus.

As illustrated in FIGS. 1 and 2, a molding apparatus as shown at 10 can be used to polymerize and shape the three dimensional slab. The molding apparatus 10 consists of a steel frame or mold 12 to support plastic mesh 14 and a porous material 16 such as filter paper. The plastic mesh 14 provides mechanical support and outlines the shape to which the polymer will form. The plastic mesh may be made of polyester, nylon, etc. The filter paper 16 prevents the monomer from dispersing, yet allows diffusion of ions.

Specifically, the molding apparatus 10 consists of a stainless steel rectangular frame 12. The casting frame 12 is then sandwiched between two pieces of Whatman 2 Filter Paper 16, sold by Whatman Int'l Ltd. The frame 12 and filter paper 16 are supported by 80 μm polyester mesh 14. The frame 12, plastic mesh 14 and filter paper 16 are then clamped 18 together. Alginate is added to the molding apparatus 10 with the use of a syringe 20 which is positioned between the frame and one piece of filter paper. The frame containing the alginate is submerged into a bath of polymerizing agent such as calcium chloride. After approximately 10 minutes, the molding apparatus is removed from the bath, disassembled and the alginate slab is washed twice in sodium chloride and then in DMEM to remove the residual calcium chloride.

Alternatively the alginate may contain cells such as cartilage cells known as chondrocytes or other neuronal cells. The polymerizing bath may include a combination of 102 mM $CaCl_2$ and 0.9% NaCl or other similar salts. The sodium chloride is important when using living tissue.

With the alginate disk system chondrocyte morphology can be maintained to optimize ECM Synthesis. It also enables one to apply mechanical compression, including both static and dynamic compression of the chondrocytes during culture and enable re-isolation of cells which is useful for mRNA analysis. It is important that the top and bottom surfaces of the slab be as close to parallel as possible to allow the mechanical testing to be accurate.

The molding apparatus may include an additional piece of filter paper along the bottom of the apparatus and the filter paper may be prewetted before the alginate is added to the molding apparatus. Also the molding apparatus may simply include the frame 12, one piece of filter paper 16 and one piece of plastic support 14. By altering the molding apparatus in this fashion, the gelling time will be increased.

The foregoing description has been limited to a specific embodiment of the invention. It will be apparent, however, that variations and modifications can be made to the invention, with the attainment of some or all of the advantages. For example the liquid may include dimers, the alginate can be utilized in the food industry to prepare foods, etc. It is the object of the claims to cover all such variations and modifications as come within the true spirit and scope of the invention.

What is now claimed is:

1. A method of producing a three dimensional section of polymerized liquid, said method comprising:

providing a molding apparatus, said apparatus including a mold having front and back sides, a piece of porous material adjacent to each side of said mold and a support layer adjacent to each of said pieces of porous material;

clamping said molding apparatus together;

adding a liquid between said mold and one of said pieces of porous material; and placing said filled molding apparatus in a bath of polymerizing agent until the liquid polymerizes to form a three dimensional section.

2. The method of claim 1, wherein the liquid contains a monomer.

3. The method of claim 2, wherein said monomer is alginate.

4. The method of claim 1, wherein the liquid contains cells therein.

5. The method of claim 4, wherein the polymerization is reversible to isolate the cells from said three dimensional section.

6. The method of claim 1, wherein said polymerizing agent includes a salt.

7. The method of claim 6, wherein said salt may be calcium chloride or a mixture of calcium chloride and sodium chloride.

8. The method of claim 1, wherein said porous material is filter paper.

9. The method of claim 8, further comprising prewetting said filter paper.

10. The method of claim 1, further comprising submerging said filled molding apparatus in said bath for approximately 10 minutes.

11. The method of claim 1, wherein said method further comprises removing said molding apparatus from said bath, disassembling said molding apparatus and removing said three dimensional section.

12. The method of claim 11, wherein said three dimensional section is washed in sodium chloride and DMEM.

13. The method of claim 12, wherein said three dimensional section is cut into desired shapes of various sizes.

14. The method of claim 1, wherein said mold is made of stainless steel.

15. The method of claim 1, wherein said molding apparatus includes two support layers.

16. The method of claim 15 wherein said support layers are plastic mesh.

17. The method of claim 16, wherein said plastic mesh is made of polyester or nylon.

18. A method of producing a three dimensional section of polymerized liquid, said method comprising:

providing a molding apparatus, said apparatus including a frame having front and back sides, first and second pieces of porous material such that said first piece of porous material is adjacent to said front side of said frame and said second piece of porous material is adjacent to said back side of said frame and first and second support layers adjacent to said first and second pieces of porous material;

clamping said molding apparatus together;

adding a liquid monomer between said frame and said first piece of filter paper; and placing said filled molding apparatus in a bath of polymerizing agent until said monomer polymerizes to form a three dimensional section.

* * * * *

UNITED STATES PATENT AND TRADEMARK OFFICE
CERTIFICATE OF CORRECTION

PATENT NO. : 6,214,262 B1
DATED : April 10, 2001
INVENTOR(S) : Ragan et al.

It is certified that error appears in the above-identified patent and that said Letters Patent is hereby corrected as shown below:

Item [54], METHOD OF MOLDING POLYMERS.

Signed and Sealed this

Eleventh Day of September, 2001

*Attest:*

*Attesting Officer*

NICHOLAS P. GODICI
*Acting Director of the United States Patent and Trademark Office*